H. E. COLLETT.
VEGETABLE CLEANER AND THE LIKE.
APPLICATION FILED JUNE 19, 1920.

1,388,630.

Patented Aug. 23, 1921.
4 SHEETS—SHEET 1.

INVENTOR
Herbert E. Collett
By W.W. Williamson
Atty

H. E. COLLETT.
VEGETABLE CLEANER AND THE LIKE.
APPLICATION FILED JUNE 19, 1920

1,388,630.

Patented Aug. 23, 1921.
4 SHEETS—SHEET 4.

INVENTOR
Herbert E. Collett
By N. W. Williamson
Atty.

UNITED STATES PATENT OFFICE.

HERBERT E. COLLETT, OF PHILADELPHIA, PENNSYLVANIA.

VEGETABLE-CLEANER AND THE LIKE.

1,388,630.

Specification of Letters Patent.  Patented Aug. 23, 1921.

Application filed June 19, 1920. Serial No. 390,110.

*To all whom it may concern:*

Be it known that I, HERBERT E. COLLETT, a citizen of the United States, residing at Philadelphia, in the county of Philadelphia and State of Pennsylvania, have invented new and useful Improvements in Vegetable-Cleaners and the like, of which the following is a specification.

My invention relates to a new and useful improvement in vegetable cleaners and the like, and has for its object to provide an exceedingly simple and effective device of this description which will rapidly remove the outer skin from potatoes and other like vegetables and from apples or other like fruits without taking therewith any considerable portion of the article being cleaned, thereby effecting a great economy.

A further object of my invention is to accomplish this cleaning by one or more wire brushes so arranged as to contact with all of the article being cleaned, and to permit the cleaning of a quantity of vegetables or fruit at the same time, thus especially adapting the device for use in restaurants, hotels and army and navy service.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Figure 1:
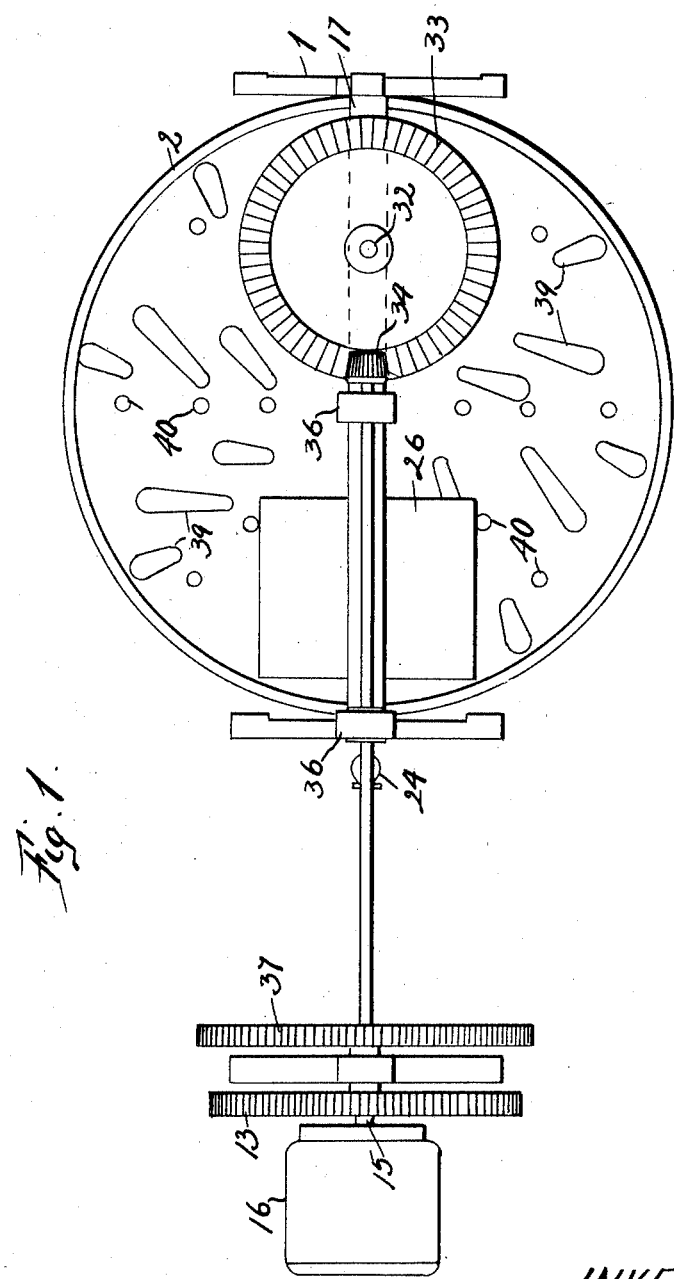
Figure 1, is a plan view of cleaning machine made in accordance with my improvement.
Figure 2:
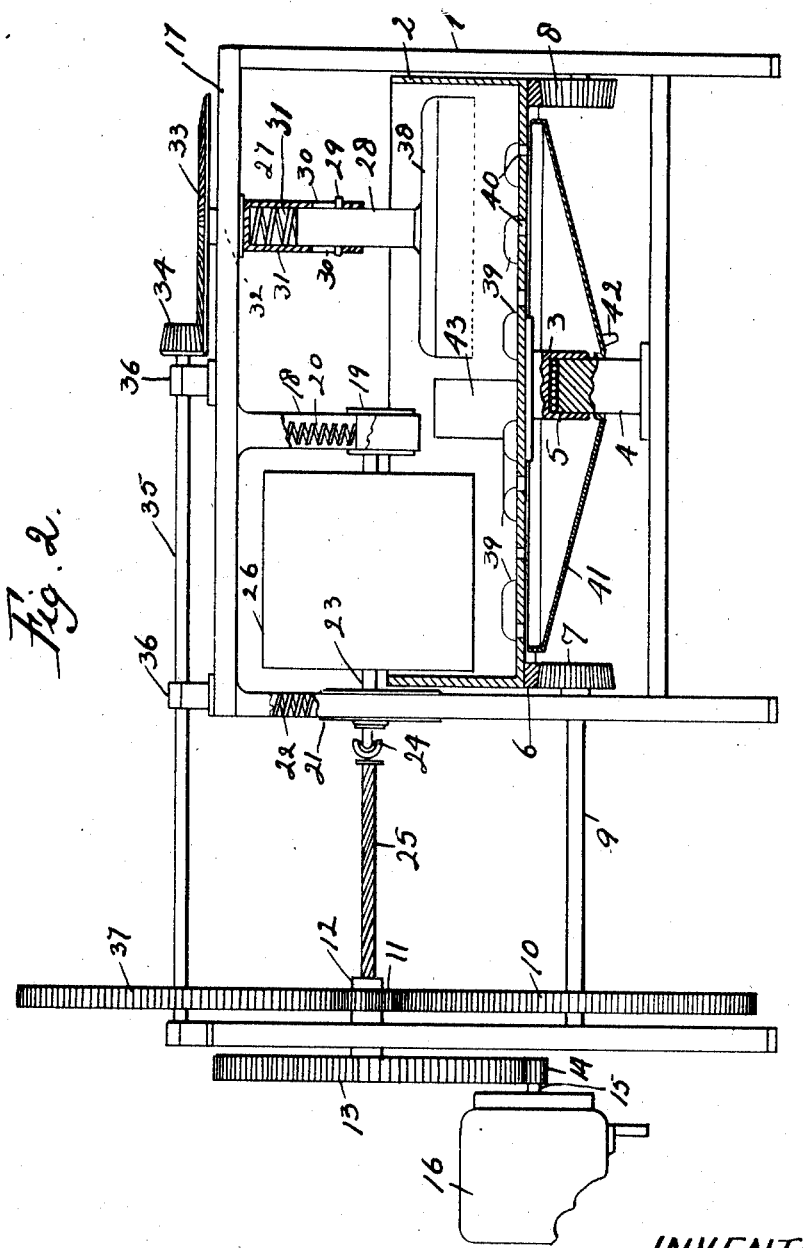
Fig. 2, is a sectional elevation of Fig. 1, partly broken away to show the interior construction of the machine.

In carrying out my invention as embodied in Figs. 1 and 2, 1 represents a frame which may be of any suitable design or dimensions, and 2 represents a cylindrical tank or receptacle for receiving the vegetables or fruits to be cleaned, and this receptacle has a central hub 3 secured to the bottom thereof which is adapted to fit over the post 4, a series of balls 5 being interposed between the upper end of the post and the inner surface of the hub so as to form a ball bearing at this point. This receptacle also carries around its lower edge the circular toothed ring 6 in which meshes the gear wheel 7 upon one side and the idle gear wheel 8 upon the opposite side, and if found desirable other idle gears may be placed at suitable points around this rack bar so as to balance the receptacle when rotating at high speed. The gear 7 is mounted upon the inner end of the shaft 9 which is journaled in the frame, and said shaft carries a gear wheel 10 which meshes with the pinion 11 the latter being secured upon the short shaft 12 upon which is secured the gear wheel 13; and this last named gear wheel meshes with the pinion 14 carried by the shaft 15 of an electric motor 16 or other suitable source of power. From this it will be seen that when the motor is put in operation the receptacle 2 will be revolved at the desired speed.

17 represents a cross bar which is mounted upon the top of the frame 1, and this cross bar has a depending hanger 18 in which is fitted a bearing journal box 19 in such manner that said box may have a vertical sliding movement with the hanger, said box being normally held down by the spring 20. Within one of the uprights of the frame is fitted a journal box 19, and this journal box is also fitted to slide when the upright is normally held down by the spring 22. These two journal boxes form the bearings for the brush spindle 23, said spindle being connected by a universal joint 24 and a flexible shaft 25 with the short shaft 12 so that the revolving of the motor will cause this brush spindle to revolve in unison therewith.

The spindle 23 carries a cleaning brush 26 so that said brush will revolve with said spindle and may be raised and lowered against the action of the springs 20 and 22 for the purpose hereinafter set forth.

Upon the underside of the cross bar 17 is located a socket 27 in which is fitted the shank 28, said shank having a pin 29 projecting therethrough, the ends of said pin also projecting into the slots 30 formed in said socket so as to permit a limited vertical movement of the shank within said socket; a spring 31 being interposed between the inner wall of the socket and the upper end of the shank so as to normally hold said shank in its lowered position. The socket 27 is secured to the lower end of the shaft 32, said shaft having its bearing in the cross bar 17 and carrying a bevel gear 33 upon the upper end thereof which gear meshes with the bevel pinion 34, the latter being secured upon the inner end of the shaft 35 journaled in the bearings 36 carried by said cross bar. The outer end of the shaft 35 has secured thereon the gear 37 which meshes with the pinion 11 so that when the motor is in operation the shank 28 will be revolved in unison therewith.

38 represents a brush carried by the shank 28 so that when said shank is revolved as just described this brush will be revolved and be capable of being forced upward against the action of the spring 31. Upon the upper surface of the bottom of the receptacle are secured lags 39 which are intended to facilitate the revolving of the vegetables or fruit placed within said receptacle, and which also has a tendency to move said articles to varying positions within the receptacle while being cleaned.

40 represents a series of holes formed through the bottom of the receptacle to provide for the draining off of the moisture and refuse tending to accumulate within the receptacle, and this moisture and refuse when passing through these holes is caught in the drip pan 41 secured to the post 7 and from thence may be withdrawn through the drain pipe 42 to any suitable point.

From the foregoing description the operation of my improvement will be obviously as follows:—

The articles to be cleaned are placed within the receptacle and the motor put in operation which will cause said receptacle to revolve at the proper speed, and this revolving of the receptacle will carry all of the articles successively beneath both the brushes 26 and 38 and when passing beneath the brush 26 the outer skin will be quickly removed to that portion of said articles which come in contact with said brush, and when in the course of the rotation of the receptacle these same articles are brought under the brush 38 they will be again subjected to the cleaning process in a reversed direction since this last named brush rotates horizontally and when the process has been continued sufficiently to subject all portions of all the articles to the action of these brushes it will be found that said articles will be thoroughly cleaned without having materially lost any weight which is of great importance from the point of economy. The lags on the surface of the bottom of the receptacle as before stated serve to move the articles being cleaned to various positions within the receptacle and also to turn said articles over by the force generated by the rotation of the receptacle. While articles are being subjected to this cleaning operation the brushes rise against the action of the springs 22 and 31 and are forced downward by said springs to accommodate brushes to various sizes of articles contained within the receptacle, the universal joint 24 and flexible shaft 25 permitting this rising and falling of the brush 26.

To facilitate the removal of articles after they have been cleaned from the interior of the receptacle I provide a door 43 in the side of the receptacle which door may be either fitted to slide or be so hinged so that it may be made water tight when closed.

Figure 3:
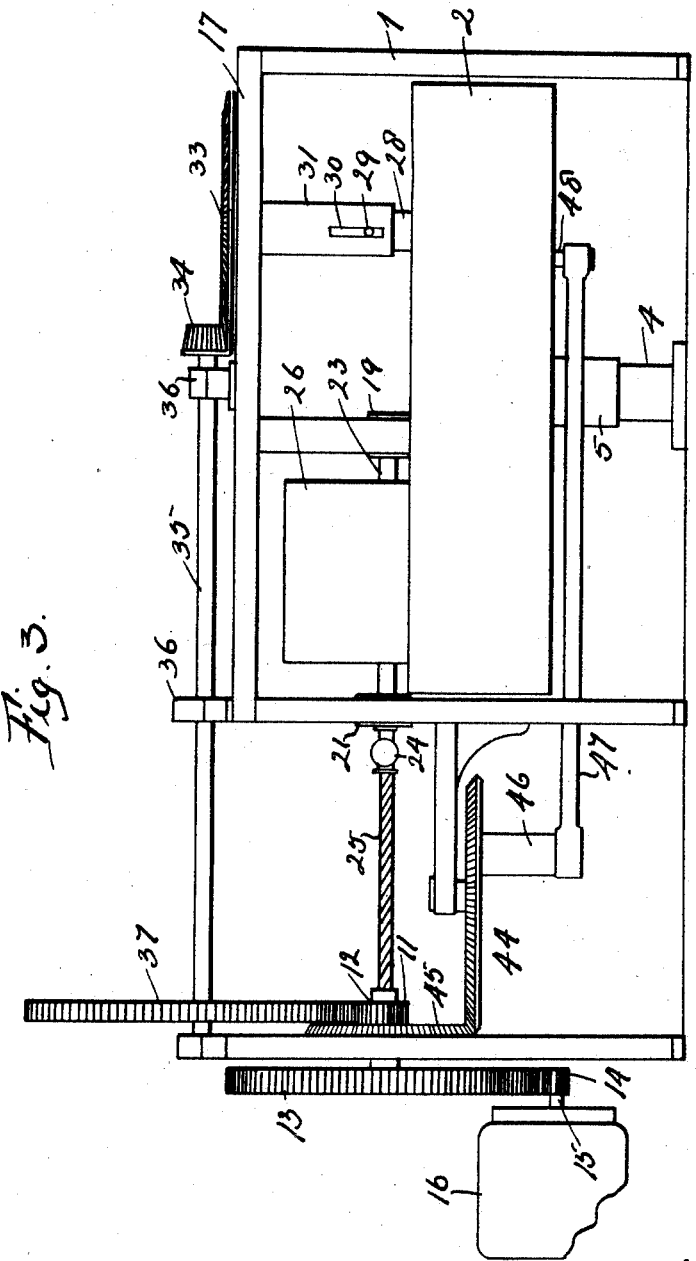
Fig. 3, is a side elevation of a slightly modified form of my improved cleaner.

In the modification shown in Fig. 3, I have shown an arrangement for oscillating the receptacle instead of rotating the same which consists in providing the bevel gear 44 which meshes with the bevel gear 25, the latter being secured upon the short shaft 12, the bevel gear 44 carrying a crank pin 46 to which one end of the pitman 47 is attached the opposite end of said pitman being attached to the wrist pin 48 secured to the underside of the receptacle 2.

The crank pin 46 is so set relative to its center of rotation and the wrist pin 48 is so set relative to its center of oscillation that the revolving of the crank pin will give the proper amount of oscillation to the wrist pin. This arrangement will cause the articles placed within the receptacle first to be moved in one direction and then the other and with sufficient momentum to give said articles a tendency to throw and thus produce an agitation which will cause the article to have all of its surfaces presented to the brushes.

Figure 4:
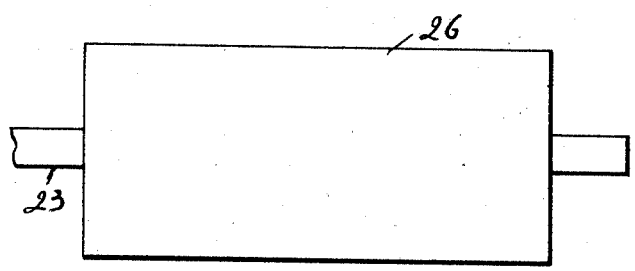
Fig. 4, is an enlarged detail view of one form of brush for use in my improved device.
Figure 5:
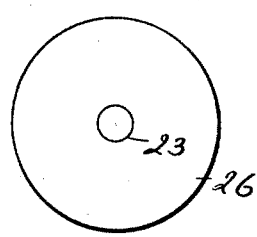
Fig. 5, is an end view of Fig. 4.
Figure 6:
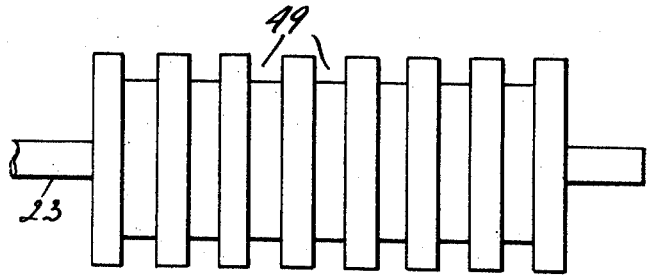
Fig. 6, is a detail view of special form of brush which is especially adapted for use in connection with my cleaner.
Figure 7:
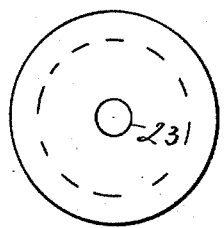
Fig. 7, is an end view of Fig. 6.
Figure 8:
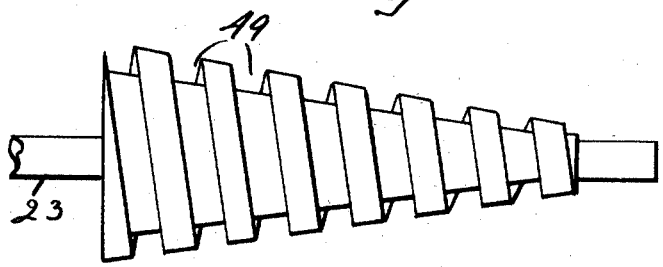
Fig. 8, is a side elevation of a spiral brush which may be utilized in connection with my invention.

The brushes are preferably made of wire bristles of sufficient stiffness to readily cut away the outer skin of the articles subjected to the action thereof without materially digging into the material beneath said skin, and in Figs. 4 and 5 I have shown one form of cylindrical brush which is adapted for cleaning certain class of vegetables and fruits, while in Figs. 6 and 7, I have shown another form of cylindrical brush which is especially adapted for cleaning vegetables and fruits of small diameter. In this last named form of brush the wire bristles are so arranged as to form grooves 49 into which the articles being cleaned may partially enter during the cleaning process thereby and subjecting a greater portion of their surfaces to the cleaning action. Such a form of brush greatly facilitates the cleaning of small potatoes and the like. In Fig. 8 I have shown a brush of spiral form which form is advantageous for certain classes of cleaning since it will take hold of the articles being cleaned and give them a traveling movement while being subjected to the cleaning process.

Of course I do not wish to be limited to the exact details of construction as herein shown as these may be varied within the limits of the appended claims without departing from the spirit of my invention.

Having thus fully described my invention, what I claim as new and useful is:

1. In a machine of the character described, a frame, a post carried by said frame, a receptacle mounted upon said post, means for revolving the receptacle, a cross bar carried by the frame, a short vertical shaft journaled in the cross bar, means for revolving said shaft, a socket carried by said shaft, a shank projecting into said socket having a limited vertical movement therein and revolving therewith, and a brush secured to the lower end of said shank.

2. In a machine of the character described, a frame, a post carried by said frame, a receptacle mounted upon said post, means for revolving the receptacle, a cross bar carried by the frame, a short vertical shaft journaled in the cross bar, means for revolving said shaft, a socket carried by said shaft, a shank projecting into said socket having a limited vertical movement therein and revolving therewith, a horizontal spindle so mounted as to have a limited vertical movement, a brush carried by said spindle and projecting into the receptacle, and means for revolving said spindle.

3. In a machine of the character described, a frame, a post carried by said frame, a receptacle mounted upon said post so as to revolve thereon, a toothed ring carried by the receptacle, gears meshing with said toothed ring so as to balance the same, a series of brushes so journaled as to project into the receptacle, and means for revolving said brushes and receptacle simultaneously.

4. In a machine of the character described, a frame, a post carried by said frame, a receptacle, a socket secured to the underside of said receptacle and fitting over said post, balls interposed between the socket and post, a toothed ring carried by the receptacle, gears meshing with said toothed ring to balance the receptacle in its rotations, a cross bar carried by the frame, a hanger projecting downward from said cross bar, a sliding journal box fitted in said hanger, a second journal box fitted to slide in one of the uprights of the frame, springs adapted to normally hold said boxes in their lowered positions, a brush spindle journaled in said boxes, a wire brush carried by said spindle, a flexible shaft connected to said spindle, a short shaft to which the opposite end of said flexible shaft is secured, a gear wheel mounted upon one end of the short shaft, said gear wheel meshing with a pinion receiving power from a suitable source, and means for transmitting power from said short shaft to the receptacle for rotating the latter.

5. In a machine of the character described, a frame, a post carried by said frame, a receptacle, a socket secured to the underside of said receptacle and fitting over said post, balls interposed between the socket and post, a toothed ring carried by the receptacle, gears meshing with said toothed ring to balance the receptacle in its rotations, a cross bar carried by the frame, a hanger projecting downward from said cross bar, a sliding journal box fitted in said hanger, a second journal box fitted to slide in one of the uprights of the frame, springs adapted to normally hold said boxes in their lowered positions, a brush spindle journaled in said boxes, a wire brush carried by said spindle, a flexible shaft connected to said spindle, a short shaft to which the opposite end of said flexible shaft is secured, a gear wheel mounted upon one end of the short shaft, said gear wheel meshing with a pinion receiving power from a suitable source, means for transmitting power from said short shaft to the receptacle for rotating the latter, a verticle shaft, a shank fitted within said socket so as to have a limited vertical movement therein, a spring mounted within the socket for normally holding the shank in its lowered position, a brush carried by the lower end of said shank, and means for revolving said brush in unison with the first named brush.

6. In a machine of the character described, a stationary post, a rotatable receptacle, a socket carried by the underside of said receptacle and fitting over said post, balls interposed between the top wall of the socket and the top of the post, means for revolving the receptacle, a spring pressed brush spindle, a brush carried by said spindle and projecting into the receptacle, means for revolving said spindle, a spring pressed shank, a brush carried by the lower end of said shank, and means for revolving the shank.

In testimony whereof, I have hereunto affixed my signature.

HERBERT E. COLLETT.